United States Patent

[11] 3,599,910

| [72] | Inventor | Frank P. Wipff |
| | | Prescott, Ariz. |
| [21] | Appl. No. | 797,840 |
| [22] | Filed | Feb. 10, 1969 |
| [45] | Patented | Aug. 17, 1971 |
| [73] | Assignee | Narco Scientific Industries, Inc. |
| | | Ft. Washington, Pa. |

[54] MOUNTING COLLAR FOR PANEL MOUNTED INSTRUMENT
4 Claims, 7 Drawing Figs.

[52] U.S. Cl.................................................. 248/27,
248/358, 240/2.1
[51] Int. Cl..................................................... G12b 9/10,
F16f 15/04
[50] Field of Search.......................................... 248/27, 56,
358; 285/208, 211; 277/105

[56] References Cited
UNITED STATES PATENTS

| 1,718,262 | 6/1929 | Stevens | 248/27 X |
| 2,227,117 | 12/1940 | Woodson | 248/27 X |
| 2,803,866 | 8/1957 | Flora | 248/27 UX |

*Primary Examiner*—William H. Schultz
*Attorney*—Paul & Paul

ABSTRACT: A mounting collar is disclosed for use with panel-mounted instruments. The mounting collar is mounted on the instrument behind the instrument panel. By tightening a few screws, the heads of which appear at the front of the panel, the mounting collar is caused to tightly embrace the instrument housing, holding it tightly in place. The instrument may be easily removed without access to the rear of the panel by merely loosening screws at the front of the panel, thereby to release the tight embrace of the mounting collar. The instrument may, of course, also be removed from the back of the panel, in the usual prior art manner.

PATENTED AUG 17 1971

INVENTOR.
FRANK P. WIPFF
BY
Paul + Paul
ATTORNEYS.

INVENTOR.
FRANK P. WIPFF
BY
Paul & Paul
ATTORNEYS.

3,599,910

MOUNTING COLLAR FOR PANEL MOUNTED INSTRUMENT

BACKGROUND OF THE INVENTION

The present invention lies in the field of mounting means for mounting instruments on instrument panels, particularly on an instrument panel having limited or difficult access to the rear thereof. As is known, instrument panels in aircraft are commonly congested to an extreme condition, particularly the rear thereof, and while this condition of itself makes replacement of an instrument difficult the condition is aggravated by the difficulty of access to the panel rear. It not infrequently happens that the repairman must put his arm through a small hole in the firewall and grope around blindly for the nuts or screws or other fastening means which must be released in order to accomplish removal of the instrument for repair or replacement.

SUMMARY OF THE PRESENT INVENTION

The primary object of the present invention is to provide means for mounting an instrument on an instrument panel, particularly on a congested instrument panel having little or no accessibility to the rear thereof following original installation of the panel.

The foregoing object is accomplished by providing a special collar behind the panel which is passed over the rear end of the instrument housing and adapted to either loosely or tightly embrace the instrument according to whether several screws whose heads appear at the front of the instrument panel, are in tightened or loosened condition. Tightening the screws causes the mounting collar to tightly embrace the instrument housing. Loosening the screws relieves the tight embrace and permits the instrument to be pulled forward and removed from the panel. In the typical case, the instrument housing is cylindrical.

DESCRIPTION OF THE PREFERRED EMBODIMENT

Figure 3:
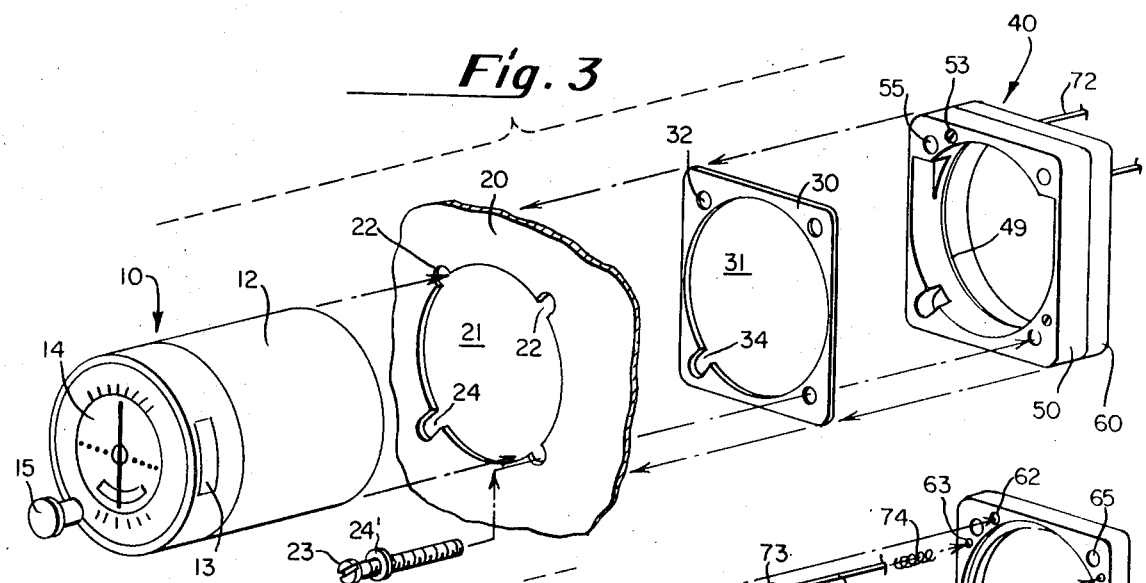
FIG. 3 is an exploded perspective view showing the instrument housing, the panel, a cover frame mounting, and the mounting collar of the present invention.

Referring first to FIG. 3, the instrument 10 to be mounted is illustrated as having a cylindrical housing or casing 12 and a display face 14. In a typical case the instrument will convert electronic information (supplied to terminals not shown at the rear of the casing by conductor leads not shown) to visual display information, as by a rotatable needle, pointer or other indicator.

A fragmentary portion of the panel into which the instrument 10 is to be mounted is shown in FIG. 3 identified by the reference numeral 20. To receive the instrument, panel 20 is provided with a hole 21 corresponding in size and shape to the cross section of housing 12 in the present case. The panel surrounding hole 21 is provided with three recesses 22 of aborted circular configuration at 90° spacings for receiving the elongated bolts 23, of which there are three, only one being shown in FIG. 3 of the drawing. A fourth and somewhat larger recess 24 is provided at the other 90° position for receiving the manual control knob 15 of the instrument 10.

Immediately behind the instrument panel 20 is a cover frame mounting 30, preferably of brass and of generally rectangular configuration having a central hole 31 corresponding in size and shape to hole 21 in panel 20. The cover frame mounting 30 is provided with three small holes 32 adapted to register with the recesses 22 in the panel 20 and through which the screws or bolts 23 will pass. A recess 34 in the cover frame mounting 30 corresponds to, and is adapted to register with, the recess 24 in the panel 20.

The mounting collar 40 is mounted behind the cover frame mounting 30. Collar 40, which is shown in exploded detail in FIG. 4, consists of a front mounting ring 50, a rear mounting ring 60, and an intermediate resilient retainer or compression ring 49, preferably of square cross section. Both the front and back mounting rings 50 and 60 are preferably aluminum, and the compression ring 49 is preferably rubber.

Each of the front and back mounting rings is provided with a central hole, 51 and 61, respectively, of a size corresponding to that of the hole 21 of the panel, and just slightly larger than the outside diameter of the instrument housing 12. The front and back mounting rings 50 and 60 are also provided with two sets of holes 52 and 62, respectively, for receiving the screws or bolts 53 for holding the front and back mounting rings together with the compression ring 49 therebetween.

Figure 5:
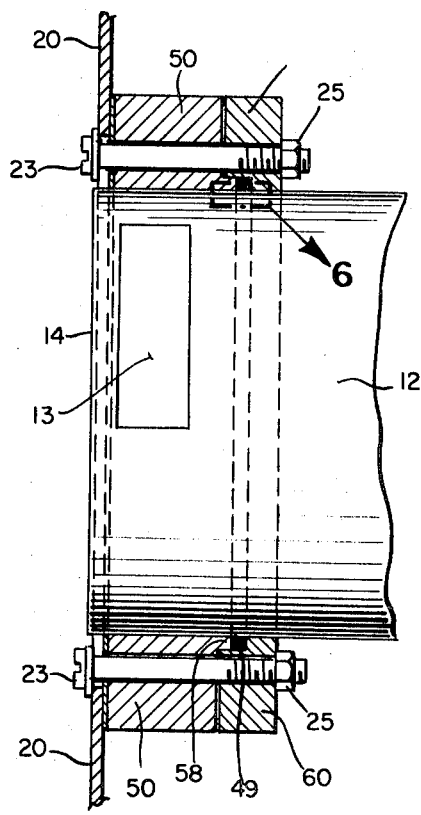
FIG. 5 is an enlarged view looking along the line 5–5 of FIG. 1 showing the instrument held in the instrument panel by the mounting collar.
Figure 7:
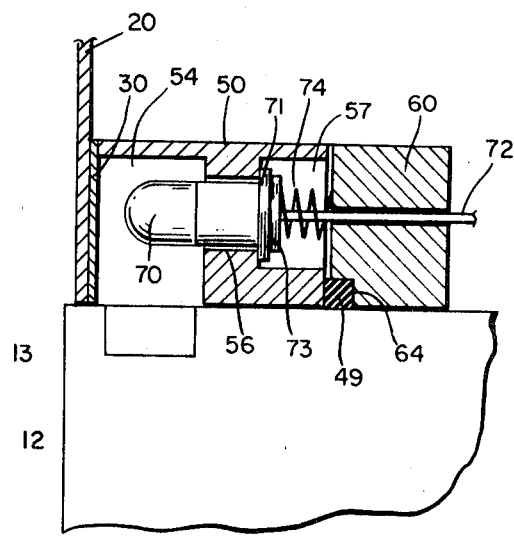
FIG. 7 is an enlarged view looking along the line 7–7 of FIG. 1 showing the manner in which one of the instrument face illumination lamps is mounted.

The peripheral edge of hole 61 of the back mounting ring 60 is provided with a recess 64 of rectangular cross section for receiving the compression ring 49. The axial dimension or depth of recess 64 is greater than the axial dimension or thickness of compression ring 49, as seen in FIG. 5, and the front mounting ring 50 is provided with a rearwardly extending peripheral flange 58 which, when the front and back mounting rings are pulled together, as by the bolts 23, is adapted to enter the recess 64 and to compress the compression ring 49. The ring 49, having nowhere else to go, is forced radially inwardly against the housing 12 of the instrument 10.

The front mounting ring 50 is provided at its forward face with two cutout or recessed portions 54, one on either side of the otherwise circular hole 51 near the upper portion of the circle. These cutout portions 54 are recesses for receiving the filament end of the instrument face illumination bulbs 70. The bulbs 70 are inserted into sockets in the front mounting ring. The sockets comprise a rearward hole 57 and a smaller forward hole 56. The diameter of the forward hole 56 is less than the diameter of the rear hole 57 forming a shoulder against which the enlarged base 71 of the bulb 70 abuts.

The bulbs 70 are held in the sockets by a wire 72 having at its forward end an insulator and eyelet 73 which is pressed by a spring 74 against the under surface of the base 71 of the bulb 70. The wire 72 is insulated and extends rearwardly from the eyelet through a set of holes 63 in the back mounting ring 60 and then on to a battery or other voltage supply. Ground return is effected through the bulb casing in conventional manner.

Figure 4:
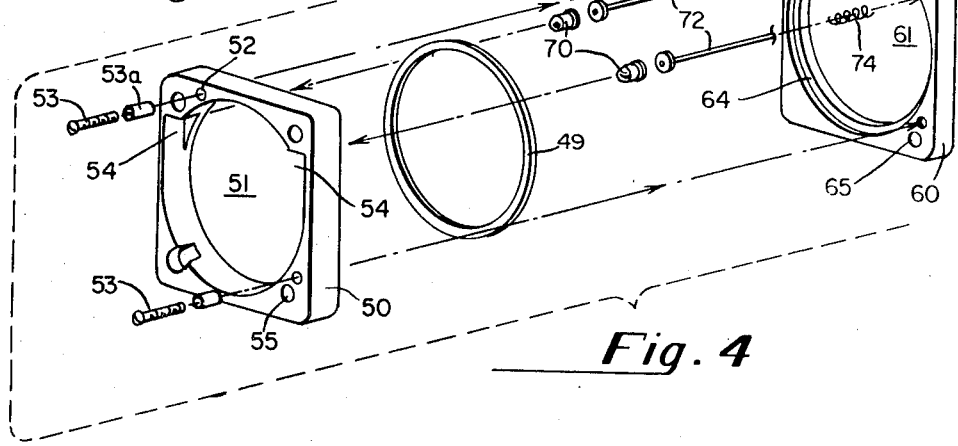
FIG. 4 is an exploded perspective view of the mounting collar.

The mounting collar shown in exploded view in FIG. 4 is assembled by inserting the compression ring 49 in the recess 64 of ring 60, placing ring 50 on ring 60, inserting the screws or bolts 53 and spacers 53a in the holes 52 and tightening the same. The assembled mounting collar is shown as the rightmost item in the exploded view of FIG. 3.

At the time of the initial installation of the panel 20, with the rear of the panel open and accessible, the assembled parts of FIG. 4, i.e., the front and back mounting rings 50 and 60, compression ring 49, bulbs 70, wire 72, insulator and eyelet 73, and spring 74, all being retained by screws and spacers 53 and 53a, form a complete unit with necessary cable and cable clamp attached to rear surface of back mounting ring 60.

This assembled unit is placed behind panel 20 and the cover frame mounting 30 is then placed between the unit and the panel 20. The three mounting screws or bolts and washers 23 and 24' are inserted into the three recesses 22 from the front of panel and through the three holes 32 of the cover frame mounting 30 and then inserted into the holes 55 of front mounting ring and corresponding holes of rear mounting ring 60 and engage the elastic stopnuts 25 attached to rear.

The screws 23 are then tightened lightly to hold the entire assembly in position. The electrical cable and connector are now pulled through the large diameter hole from the rear and the connector is attached to the mating connector on the rear of the case of the instrument 10.

The instrument 10 is now inserted through the hole 21 in the panel 20, and holes 51 and 61 of mounting rings 50 and 60.

Figure 6:
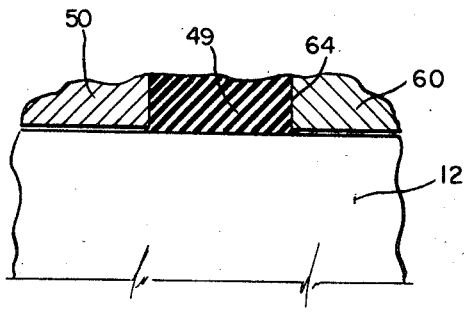
FIG. 6 is a greatly enlarged view of that portion of FIg. 5 shown in the dot-and-dash rectangle identified as 6.

As previously indicated, when the bolts 23 are tightened, as by inserting a screwdriver into the slotted heads of the bolts and and turning in a direction to tighten the same, the back mounting ring 60 is pulled forwardly toward the front mounting ring 50, whereupon the rubber compression ring 49 is compressed and, having nowhere else to go, is forced radially inwardly toward the external surface of the casing 12 of the instrument 10, as illustrated in FIG. 6, thereby gripping the casing 12 and holding it firmly in place. The degree to which the instrument housing 12 is held is sufficient to maintain the instrument fixed in the panel during operational use, and is also sufficient to hold it against withdrawal forces encountered during normal use.

Figure 1:
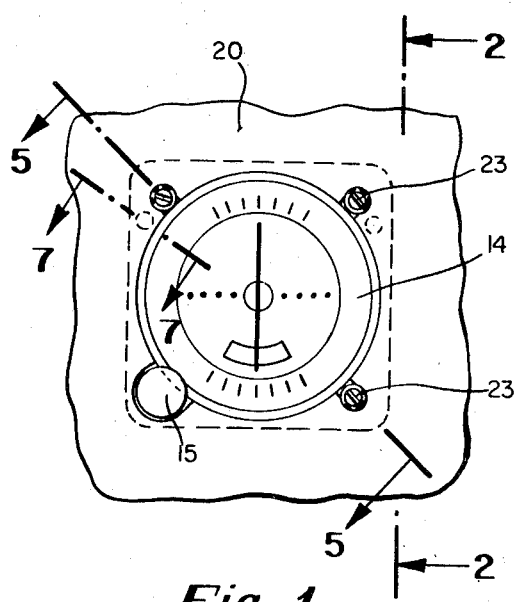
FIG. 1 is a front view of a typical instrument mounted in the instrument panel.
Figure 2:
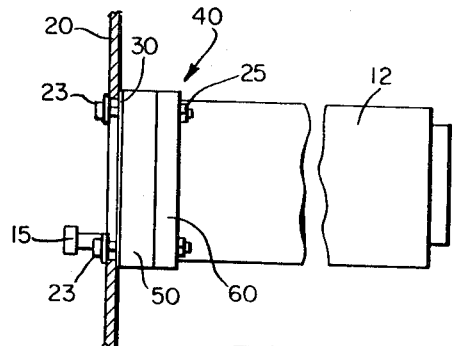
FIG. 2 is a side elevational view of the panel-mounted instrument of FIG. 1 looking along the line 2–2 of FIG. 1.

When, following initial installation of the instrument panel, it becomes necessary to repair or replace an instrument 10, it is merely necessary to insert a screwdriver in the slotted heads of bolts 23, which as illustrated in FIG. 1 are bulb accessible at the front of the panel 20, and to loosen slightly the bolts. This allows the resilient compression ring 49 to ring and to return radially outwardly toward its noncompressed condition. This relieves the frictional engagement between the ring 49 and the outer surface of the casing 12 of the instrument 10 and the instrument may thereupon be readily pulled forward and withdrawn from the instrument panel 20. Any conductor leads which are connected to the rear of the instrument casing have sufficient slack to allow for the removal of the instrument in the manner described.

To allow light from the bulbs 70 to pass from the recesses 54 into the interior of the instrument housing 12 to illuminate the face of the instrument, a pair of windows 13 are provided in the housing 12, as seen in FIGS. 3 and 5.

What I claim is:

1. In combination:
   a. a display instrument having a housing,
   b. a panel having a hole therein through which said instrument housing is passed,
   c. a mounting collar adapted to embrace said housing in back of said panel, said mounting collar comprising,
   d. a front collar member, a back collar member, and a resilient compression ring between said front and back collar members;
   e. fastening means passed through holes in said panel for connecting together said front and back collar members;
   f. said fastening means being accessible for adjustment from the front of said panel, said fastening means when adjustably tightened operating to pull said front and back members together to compress said compression ring, thereby to force said compression ring radially inwardly toward said instrument housing, thereby to releasably secure said instrument fixed in said panel, said fastening means when adjustably loosened operating to release said instrument housing, thereby to allow removal of said instrument from the front of said panel;
   g. one of said front or back collar members having a groove at the periphery of its opening for receiving said compression ring,
   h. said peripheral groove facing said other collar member and also facing radially inwardly,
   i. said groove having a greater dimension in the axial direction than said compression ring in its uncompressed state,
   j. the other of said front or back collar members having an inner peripheral flange adapted to enter said peripheral groove to compress said compression ring.

2. The combination according to claim 1 characterized in that:
   a. said fastening means comprise bolts adapted to extend through said panel and through said front and back collar members, the head of said bolts when fully installed being on the front of said panel and accessible for adjustment.

3. The combination according to claim 2 characterized in that said peripheral groove is in said back collar member and in that said inner peripheral flange is on said front collar member.

4. The combination according to claim 3 characterized in that said instrument housing is cylindrical.

UNITED STATES PATENT OFFICE
CERTIFICATE OF CORRECTION

Patent No. 3,599,910                     Dated August 17, 1971

Inventor(s) Frank P. Wipff

It is certified that error appears in the above-identified patent and that said Letters Patent are hereby corrected as shown below:

Column 3, line 30, change "bulb" to --readily--.

Column 3, line 32, change "ring" to --relax--.

Signed and sealed this 4th day of January 1972.

(SEAL)
Attest:

EDWARD M. FLETCHER, JR.              ROBERT GOTTSCHALK
Attesting Officer                    Acting Commissioner of Patents